US009313184B2

(12) United States Patent  
Tanizawa et al.

(10) Patent No.: US 9,313,184 B2  
(45) Date of Patent: Apr. 12, 2016

(54) COMMUNICATION APPARATUS, COMMUNICATION SYSTEM, AND COMPUTER PROGRAM PRODUCT

(71) Applicant: Kabushiki Kaisha Toshiba, Minato-ku (JP)

(72) Inventors: Yoshimichi Tanizawa, Yokohama (JP); Hideaki Sato, Yokohama (JP); Shinichi Kawamura, Kodaira (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 121 days.

(21) Appl. No.: 14/161,049

(22) Filed: Jan. 22, 2014

(65) Prior Publication Data

US 2014/0208116 A1    Jul. 24, 2014

(30) Foreign Application Priority Data

Jan. 22, 2013    (JP) ................................. 2013-009567

(51) Int. Cl.
*H04L 29/06* (2006.01)
*H04L 9/08* (2006.01)

(52) U.S. Cl.
CPC .............. *H04L 63/06* (2013.01); *H04L 9/0816* (2013.01); *H04L 9/0819* (2013.01); *H04L 9/0822* (2013.01); *H04L 63/04* (2013.01); *H04L 63/0428* (2013.01); *H04L 63/0435* (2013.01)

(58) Field of Classification Search
CPC ............ H04L 9/08; H04L 63/04; H04L 63/06
USPC .............................. 713/150–175; 380/255–30
See application file for complete search history.

(56) References Cited

U.S. PATENT DOCUMENTS

| | | | | |
|---|---|---|---|---|
| 2002/0001388 | A1* | 1/2002 | Ko et al. | 380/282 |
| 2004/0068655 | A1* | 4/2004 | Nishimura et al. | 713/171 |
| 2006/0059343 | A1* | 3/2006 | Berzanskis et al. | 713/171 |
| 2008/0101607 | A1* | 5/2008 | Liang et al. | 380/260 |
| 2008/0301445 | A1* | 12/2008 | Vasic et al. | 713/171 |

FOREIGN PATENT DOCUMENTS

| | | |
|---|---|---|
| JP | 2006-514512 | 4/2006 |
| JP | 2008-154019 | 7/2008 |

OTHER PUBLICATIONS

Mehrdad Dianati, et al., "Architecture and protocols of the future European quantum key distribution network", Security and Communication Networks, 1:57-74, DOI: 10.1002/sec.13, 2008, 18 pages.

* cited by examiner

*Primary Examiner* — Madhuri Herzog

(74) *Attorney, Agent, or Firm* — Oblon, McClelland, Maier & Neustadt, L.L.P.

(57) ABSTRACT

According to an embodiment, a communication apparatus includes a sharing processing unit, an extension unit, and a communication unit. The sharing processing unit shares a first cryptographic key with an external apparatus connected via a link, and further generates a second cryptographic key and shares the second cryptographic key with the external apparatus through secret communication using the first cryptographic key. The extension unit generates an extended key by extending a length of the second cryptographic key. The communication unit transmits the extended key to a first application which communicates with a second application to which the external apparatus provides the second cryptographic key.

10 Claims, 4 Drawing Sheets

US 9,313,184 B2

COMMUNICATION APPARATUS, COMMUNICATION SYSTEM, AND COMPUTER PROGRAM PRODUCT

CROSS-REFERENCE TO RELATED APPLICATION(S)

This application is based upon and claims the benefit of priority from Japanese Patent Application No. 2013-009567, filed on Jan. 22, 2013; the entire contents of which are incorporated herein by reference.

FIELD

Embodiments described herein relate generally to a communication apparatus, a communication system, and a computer program product.

BACKGROUND

A cryptographic communication network (a key sharing network) configured with a plurality of nodes, which is connected to each other through a plurality of links and networked, has been known. Each node has a function of generating and sharing a random number with opposite nodes that are connected via links, as well as has a function of performing cryptographic communication over a link by using a random number as a cryptographic key (hereinafter referred to as "a link key"). Further, some of the nodes also have a function of generating a cryptographic key (hereinafter referred to as "an application key") which is a random number independent of the links, as well as have a function of transmitting the generated application key to a different node via a link. An application in the key sharing network has a function of acquiring an application key from a node and, using the application key as a cryptographic key, performing cryptographic communication with another application. The cryptographic data communication at this time may be performed using a network (an application network) which is different from the key sharing network, such as the Internet. Meanwhile, applications and nodes may be configured in an integrated manner. Alternatively, applications and nodes may be configured as terminals independent of each other, and application keys may be transmitted and received among the application and nodes.

In a node, the function of generating a random number (a link key) and sharing it with opposite nodes that are connected through links may also be implemented using, for example, a technique which is commonly referred to as quantum cryptographic communication. In this case, a technique in which a random number (an application key) is generated in a node independently of a link and the generated random number is transmitted to another node via a link is sometimes referred to as quantum key distribution (QKD).

An application may want to acquire an application key from a node faster and more stably. Accordingly, a node has a need to provide an application key to an application faster and more stably without being affected by restrictions (low throughput, variation, and the like) in by the quantum cryptographic technique.

DETAILED DESCRIPTION

According to an embodiment, a communication apparatus includes a sharing processing unit, an extension unit, and a communication unit. The sharing processing unit shares a first cryptographic key with an external apparatus connected via a link, and further generates a second cryptographic key and shares the second cryptographic key with the external apparatus through secret communication using the first cryptographic key. The extension unit generates an extended key by extending a length of the second cryptographic key. The communication unit transmits the extended key to a first application which communicates with a second application to which the external apparatus provides the second cryptographic key.

Referring to the accompanying drawings, a preferred embodiment of a communication apparatus will be described below in detail.

A speed (sharing speed), at which nodes connected to a key sharing network shares an application key, is restricted by a speed, at which a link key is exchanged and shared in an internode link over which the application key is transferred. Further, the sharing speed of the application key may determine a speed at which the application is able to acquire the application key. Accordingly, the sharing speed of the application key may restrict a maximum speed at which the application is able to conduct cryptographic communication. Particularly, when the application employs a cryptographic method utilizing an application key having the same length as data, which is called an OTP (One-time Pad), the speed at which the application is able to acquire the application key corresponds to a speed at which the application is capable of communicating. When the current quantum cryptographic technique is used, the speed at which the link key is exchanged and shared is at most less than a few Mbps. Moreover, the speed may also fluctuate depending on an installation environment of the apparatus.

Therefore, as described above, when the speed at which the link key is shared is small, or even when the speed at which the link key is shared fluctuates, it is desirable that the application key be provided faster and more stably.

Figure 1:
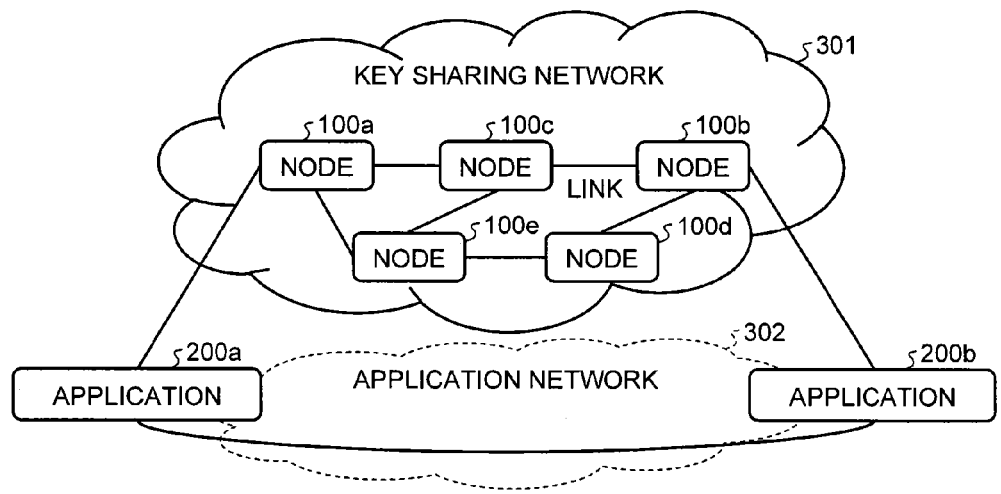
FIG. 1 is a network configuration diagram of a communication system according to a present embodiment.

FIG. 1 is a diagram illustrating a network configuration example of a communication system according to a present embodiment. The communication system includes a key sharing network 301 and an application network 302. Further, the communication system includes nodes 100a to 100e serving as communication apparatuses and applications 200a, 200b.

If it is not necessary to distinguish the nodes 100a to 100e, there is a case in which a node 100 is simply used. If it is not necessary to distinguish the applications 200a, 200b, there is a case in which an application 200 is simply used. The number of nodes 100 is not limited to five. Moreover, the number of applications 200 is not limited to two. FIG. 1 is an example of a case in which the node 100 and the application 200 are independently implemented.

As described above, the nodes 100*a* to 100*e* have a function of generating a random number and sharing it with an opposite node, and a function of performing cryptographic communication over the link by using the generated random number as a link key.

The node 100 may have a function of generating a random number independently of the link, and a function of transmitting the generated random number to the other node.

Figure 2:
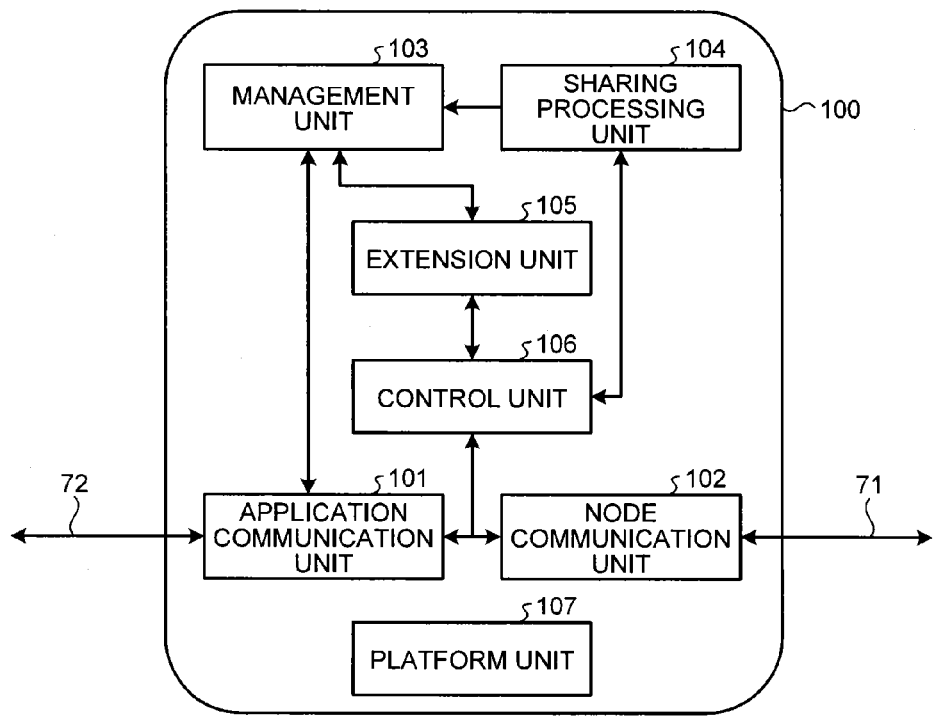
FIG. 2 is a block diagram of a node in the present embodiment.

FIG. 2 is a block diagram illustrating a configuration example of the node 100 in the present embodiment. The node 100 includes an application communication unit 101, a node communication unit 102, a management unit 103, a sharing processing unit 104, an extension unit 105, a control unit 106, and a platform unit 107.

The node communication unit 102 generates a random number and shares it with an opposite node connected via an internode link 71 by using a quantum cryptographic communication technique, and manages the generated random number as a link key. Further, the node communication unit 102 is utilized when internode data communication is performed with the other node 100 connected via the internode link 71. Here, the other node 100 may be an opposite node directly connected via the internode link 71, or a different node 100 further connected to the opposite node via a different internode link 71 thereof. In the latter case, the node communication unit 102 may provide a routing function for performing communication through the plurality of nodes 100 in the cryptographic communication. Data exchanged between the nodes 100 through the node communication unit 102, for example, is data of an application key. These data may be transmitted and received via encrypted communication (secret communication) by using the link key managed by the nodes 100. It should be noted that only one node communication unit 102 is illustrated in FIG. 2. However, the node communication unit 102 may be connected with the plurality of nodes 100 via the plurality of internode links 71.

The sharing processing unit 104 generates an application key (cryptographic key) as a random number and shares it with the other node 100. The application key, for example, is generated as a random number in a form to which identification data (ID) capable of identifying the application key is added. A format of the ID of the application key is not particularly specified. Hereinafter, it is assumed that an order is identified by successive numbers. The generated application key is stored in the management unit 103. In response to an instruction from the control unit 106 or the like, the sharing processing unit 104 can encrypt the generated application key by using the node communication unit 102, and transmit this to the other node 100 to share it therewith. Likewise, the sharing processing unit 104 receives the application key received from the other node 100 through the node communication unit 102, and stores the received application key in the management unit 103.

The management unit 103 stores and manages the application key. The application key stored in the management unit 103 is a key generated by the sharing processing unit 104 or a key received from the separate node 100 via the node communication unit 102. The application key stored in the management unit 103 is one of the most important data for security in the cryptographic communication system. For this reason, security measures, such as encryptions, tamper-preventions, and access restrictions, may be taken by a file system or an OS (operating system). Although various implementation methods are possible for the management unit 103, the management unit 103 can be mounted, for example, as a file system or a data base.

The extension unit 105 generates an extended key by extending the application key stored in the management unit 103 according to predetermined rules (i.e., a key length is increased). An example of processing of extending the key will be described later. The extension unit 105 may store again the extended application key in the management unit 103. Further, when the application communication unit 101 acquires the application key from the management unit 103, the application key may be extended by using the extension unit 105, and the extended key obtained by the extension may be provided to the application through the application communication unit 101. Moreover, when the sharing processing unit 104 stores the generated or received application key in the management unit 103, the application key may be extended by using the extension unit 105, and the result may be stored in the management unit 103.

The application communication unit 101 connects and communicates with the application 200 via an application communication link 72. The application communication unit 101 receives requests from the application 200, for example, a cryptographic communication starting request (i.e., an application key provision starting request), a cryptographic communication ending request (i.e., an application key provision ending request), and an application key acquiring request. The application communication unit 101 provides the extended key, which is obtained by extending the application key, to the application 200 according to the request from the application. The extended key provided to the application 200 (or the application key from which the extended key is obtained) may be deleted from the management unit 103.

The control unit 106 controls the above-described units implementing the functions of the node 100, and executes a series of the application key sharing operations in the key sharing network. For example, the control unit 106 instructs and controls the sharing processing unit 104 to share the application key. Further, the control unit 106 has functions of performing communication with the node 100 (partner node) which shares the application key, and determining and changing the operation of the key extension. For example, the control unit 106 exchanges information about an extension method of the application key with the partner node and determines the extension method to be applied. Then, the control unit 106 controls the extension unit 105 so as to synchronize with the other node 100 and execute the extension processing according to the determined extension method. The processing of determining the extension method set for the extension unit 105 by exchanging the information about the extension method of the application key with the other node 100 is referred to as negotiation about key extension.

The platform unit 107 provides management of the other components on the node 100, an operating system function of a computer necessary for the operation, a basic network function, a security function, and the like.

A configuration of the node 100 in the present embodiment has been described above. However, the above description is one example.

Figure 3:
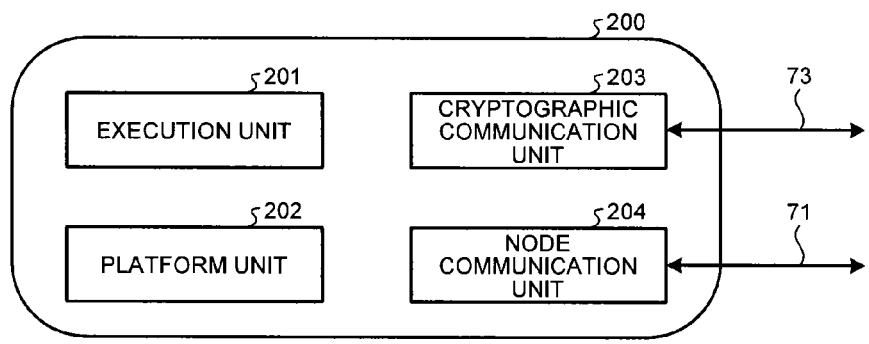
FIG. 3 is a block diagram of an application in the present embodiment.

Next, the application 200 in the present embodiment will be described. FIG. 3 is a block diagram illustrating a configuration example of the application 200 in the present embodiment. The application 200 includes a node communication unit 204, a cryptographic communication unit 203, an execution unit 201, and a platform unit 202.

The node communication unit 204 connects and communicates with the node 100 (the application communication unit 101 on the node 100) via the internode link 71. The node communication unit 204, for example, acquires the application key necessary for performing cryptographic communication from the node 100. In the present embodiment, the node communication unit 204 acquires the extended key, which is the application key extended by the extension unit 105 as described above, from the node 100. The node communication unit 204 transmits to the node 100 an acquisition starting request of the extended key before starting the acquisition of the extended key, and an ending request when the acquisition of the extended key ends. Further, the node communication unit 204 stores and manages the acquired extended key. The extended key stored by the node communication unit 204 is used by the cryptographic communication unit 203. Upon receiving the request of the extended key from the cryptographic communication unit 203, the node communication unit 204 provides the stored extended key to the cryptographic communication unit 203.

The execution unit 201 executes an application function of performing cryptographic communication. The type of the application function is not particularly limited as long as the communication is performed. For example, the execution unit 201 executes a function of transmitting and receiving a video image or the like. Upon the cryptographic communication, the execution unit 201 transmits and receives data by utilizing the cryptographic communication unit 203.

The cryptographic communication unit 203 provides a communication function necessary for the operation of the execution unit 201, an encryption function of communication data, and a decryption function of the communication data. Upon receiving transmit data from the application 200, the cryptographic communication unit 203 encrypts the received transmit data, and transmits the cryptographic data to the application network 302 via a cryptographic data communication link 73. Further, upon receiving the data from the cryptographic data communication link 73 via the application network 302, the cryptographic communication unit 203 decrypts the received data. The cryptographic communication unit 203 delivers the decrypted data to the execution unit 201. When necessary for encryption and decryption, the cryptographic communication unit 203 acquires a new extended key from the node communication unit 204.

In the present embodiment, a cryptographic algorithm used by the cryptographic communication unit 203 is not particularly limited. A Vernam cipher, such as an OTP, or a block cipher, such as an AES (Advanced Encryption Standard) may be used. However, the cryptographic communication unit 203 utilizes the extended key stored in the node communication unit 204 for cryptographic communication. Further, the cryptographic communication unit 203 may execute a data authentication function and a communication partner authentication function in addition to the encryption function.

The platform unit 202 provides management of the other components on the application 200, an operating system function of a computer necessary for the operation, a basic network function, a security function, and the like.

A configuration of the application 200 in the present embodiment has been described above. However, the above description is one example.

Figure 4:
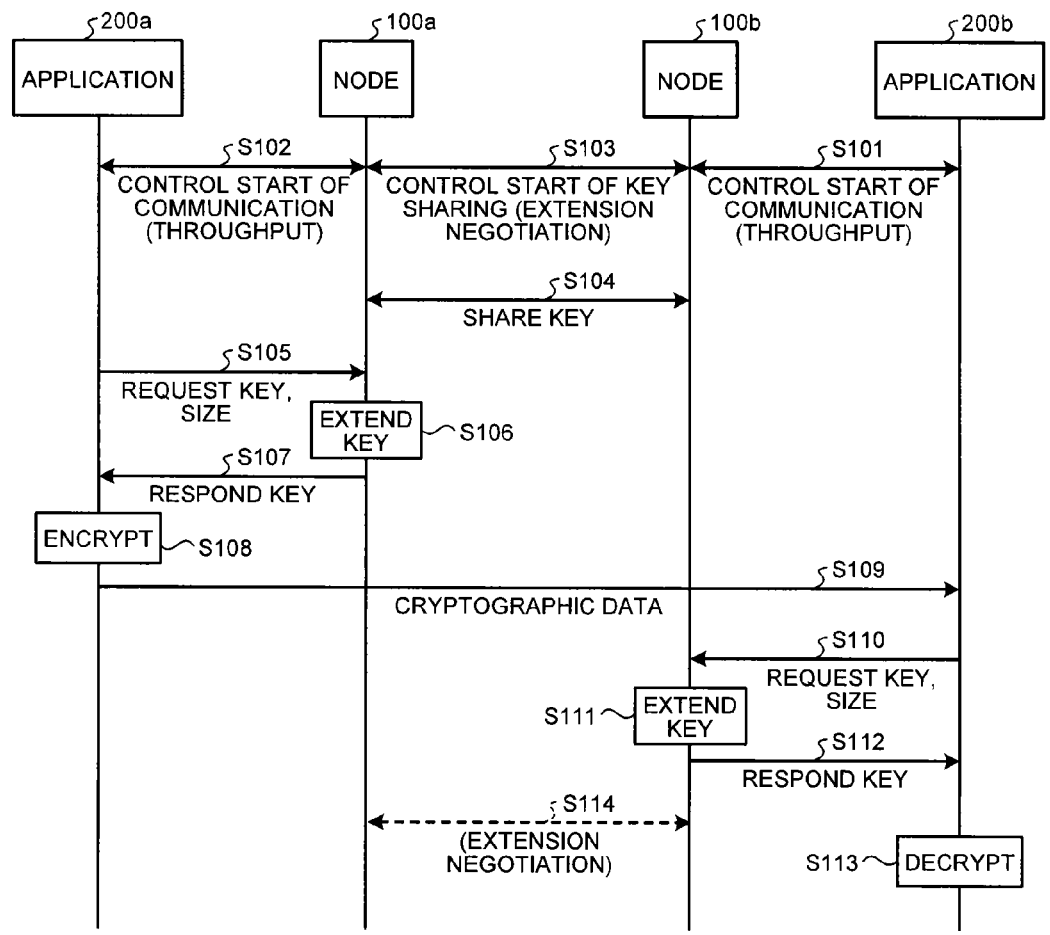
FIG. 4 is a sequence diagram of cryptographic communication processing according to the present embodiment.

Next, a basic sequence of cryptographic communication processing according to the present embodiment will be described. FIG. 4 is a sequence diagram illustrating an example of the cryptographic communication processing according to the present embodiment. A situation in which the application 200a connected to the node 100a performs cryptographic communication with the application 200b connected to the node 100b is assumed below. It should be noted that the node 100a and the node 100b may be directly connected via the internode link 71 or may be connected via the other nodes 100 (the nodes 100c to 100e).

First, the application 200b notifies the node 100b, to which the application 200b is connected, that the start of communication is in a receivable state and of information of type of communication which is receivable (e.g., a port number receiving the start of communication, information of a throughput capable of communicating, or the like). The node 100b manages the communication-capable state of the application 200b, and makes it sharable with the other node 100. Subsequently, the application 200b is actually in a state in which the start of cryptographic data communication is receivable (step S101).

Next, the application 200a controls the start of communication (step S102). The application 200a, for example, notifies the node 100a, to which the application 200a is connected, of a communication starting request. At this time, the application 200a specifies address information, a port number, and the like of the application 200b. Besides specifying the address and the like, the application 200a may notify of information (request throughput) about a throughput (utilization rate of an application key to be requested or the like) in case of acquiring the application key. The request throughput may be previously set to the application 200a by a user. Further, upon executing the application function, the application 200a may record data which has been transmitted through cryptographic communication and information of a communication speed, and the application 200a may determine a request throughput. For example, when an application function of sending a video is operated and an OTP is utilized for encryption, a bit rate of the video can become a request throughput without any change.

When the node 100a receives the communication starting request from the application 200a connected thereto, the node 100a controls the start of key sharing. In order to provide the application key (extended key) used in the requested cryptographic communication, the node 100a specifies the node 100 (herein, the node 100b), which serves as a target of performing the key sharing, by retrieving address information of the application which is managed by each node and is in the communication-capable state or the like, and then performs communication. The state in which the key sharing is executable is initialized between the nodes. Simultaneously, the node 100a and the node 100b perform negotiation of the extension processing of the key, which will be described below (step S103). It should be noted that, at this time, the node 100b may notify the application 200b of the request throughput notified from the application 200a, the address information of the application 200a, or the like. Upon reception of this information, the application 200b can reject the communication starting request from the application 200a.

When the key sharing start control is completed in step S103, the node 100a actually shares the application key with the specified node 100b (step S104).

When the request throughput (the utilization rate of the application key to be requested or the like) is notified from the application 200a, the control unit 106 of the node 100a may perform control so as to share the application key at a speed satisfying the request throughput. After the series of sharing processing of the application key has been started, the node 100a may return to the application 200a a response that the sharing of the application key has been started.

The application 200a requests acquisition of the application key to the node 100a (step S105). The application 200a may transmit a size of the extended key to be used together with the request of the key. Upon receiving the request of the application key, the extension unit 105 of the node 100a extends the application key (step S106). The application communication unit 101 of the node 100a transmits the extended key obtained by the extension to the application 200a (step S107).

The application 200a, which has received the extended key, starts the cryptographic communication (transmission of the cryptographic data) with the application 200b. For example, the cryptographic communication unit 203 uses the extended key as a cryptographic key (application key) and encrypts data to be transmitted (step S108). The cryptographic communication unit 203 transmits the encrypted cryptographic data to the application 200b (step S109).

The application 200b, which has received the cryptographic data, requests the connected node 100b to acquire the application key (the extended key) for decrypting the cryptographic data (step S110 to step S112). This processing is similar to step S105 to step S107, which are executed by the application 200a. The cryptographic communication unit 203 of the application 200b decrypts the cryptographic data by using the acquired extended key (step S113). Accordingly, the cryptographic data communication is completed.

The above description is the basic sequence assumed in the present embodiment.

In the present embodiment, as illustrated in FIG. 4, the communication (negotiation) for extending the application key may be conducted between the node 100a and the node 100b (step S102). The negotiation is performed when the control units 106 of the respective nodes 100 mutually communicate via the node communication unit 102.

The plurality of applications 200 may be connected to the node 100. For example, from such a reason, the node 100a may be requested to provide the application key to the application 200a at a throughput which exceeds a throughput of the application key which can be exchanged and shared with the node 100b. The control unit 106 of the node 100a determines necessary extension magnification of the application key based on, for example, a total request throughput requested by the application 200, information of an actual sharing speed when the application key is exchanged and shared with the node 100b, and the like. The request throughput can be, for example, acquired from the application communication unit 101. The information of the sharing speed can be, for example, acquired from the sharing processing unit 104.

For instance, it is assumed that the sharing speed of the application key with the node 100b is 1 Mbps, and the total of the request throughput requested by the application 200a connected thereto is 5 Mbps. In this case, by extending the application key by five times or more, the request of the application key from the application 200a can be met. Further, the node 100a simultaneously determines the extension method of extending the application key. In this determination, extension magnification of the application key to be needed, an amount of calculation necessary for the extension of the application key, and a type of an application key extending algorithm of the node 100a are referred to.

The control unit 106 of the node 100a transmits information (hereinafter, referred to as "extension method data"), which indicates at least one extension method, to the node 100b via the node communication unit 204. The extension method data, for example, includes extension magnification of the application key and information of an algorithm for executing the extension of the application key. An ID of the application key for indicating from which application key is subjected to the extension processing may be added to the extension method data. Further, the node 100a may transmit the plurality of extension method data, to which information of the priority order is added, to the node 100b. The node 100b may refer to the priority order and determine an extension method to be used from the plurality of extension method data.

The control unit 106 of the node 100b, which has received the extension method data, receives information of the extension method data via the node communication unit 204, and knows the extension magnification and the extension algorithm of the corresponding application key, and the ID of the application key which starts extension, and the like. Upon reception of the plurality of extension method data, the control unit 106 of the node 100b may determine the extension algorithm and the extension magnification to be used based on the information of the extension algorithm to be supported, and return a determination result to the node 100a.

It should be noted that, when the extension cannot be started from the application key having the specified ID, the ID of the key which indicates the application key, to which the extension processing is actually applicable, may be added to the response of the determination result. For example, a case in which the application key having the specified ID has been already provided to the application 200 (without extension) corresponds to the case in which the extension cannot be started from the application key having the specified ID.

When the control unit 106 instructs the extension unit 105, the node 100b starts the extension processing. The node 100a, which has received the response, determines the magnification, the extension algorithm, and the ID of the application key to be targeted for actually performing the extension processing, and starts the extension processing.

With such a configuration, the node 100a and the node 100b can start, from the application key having the same ID, the extension processing by the application key with the common extension algorithm and the common extension magnification. As a result, the node 100 can provide the application key which satisfies the request throughput requested by the application 200.

It should be noted that, after the extension algorithm and the like are determined and the extension processing can be started, timing at which the extension processing is actually performed by the extension unit 105 has several variations. For example, a case in which the application keys stored in the management unit 103 are sequentially subjected to the extension processing, and a case in which, upon request of the application key from the application communication unit 101, the extension processing of the requested application key is performed are considered. FIG. 4 illustrates the latter case.

It should be noted that FIG. 4 illustrates an example in which the control unit 106 starts negotiation of the extension processing simultaneously with or immediately after the sharing and exchanging processing of the application key is started between the node 100a and the node 100b (step S101, step S102). The timing at which the negotiation of the extension processing by the control unit 106 is performed is not limited to this.

As also illustrated in FIG. 4, the extension negotiation of the application key by the control unit 106 of the node 100 may be performed during the sharing of the application key (step S114), and the extension processing may be newly started. Further, the determined extension method, magnification, and the like may be changed in the similar manner during the sharing of the application key. The control unit 106 may perform the extension negotiation at timing at which, for example, a different application 200 newly requests the start of communication and a sharing speed of the application key requested between the node 100a and the node 100b is increased.

Additionally, the control unit 106 may change the extension magnification and the extension method due to changes in the quantum cryptographic parameters observable by the node 100 such as, for example, a change in the sharing speed of the link key to be shared by the quantum cryptographic communication, the increase in an error rate of the quantum cryptographic communication, and the like. This is because the speed of the application key which can be actually shared between the node 100a and the node 100b is highly likely to be changed or reduced by these factors.

Further, the control unit 106 may be configured so as to previously assume the occurrence of variations in the quantum cryptographic parameters (e.g., a link key generating speed and an error rate) and determine in the extension negotiation a list of combinations of variation values of these quantum cryptographic parameters and the extension method data when the parameters are varied.

For example, a condition such as, "if a link generating speed is 100 kbps or less, the extension magnification is increased by 100 times", "if it is 500 kbps or less, the extension magnification is increased by 20 times", and "if it is 1000 kbps or less, the extension magnification is increased by 10 times", may be previously determined between the nodes 100 by the extension negotiation. However, even in this case, in order to synchronize between the node 100a and the node 100b from which extension magnification of the application key is strictly changed, the information of the ID of the application key may be exchanged between the nodes 100.

Description has been given herein of the embodiment in which the node 100a and the node 100b communicate through the node communication unit 204. However, the extension magnification and the algorithm of the application key may be determined by using other paths.

An example of extension algorithm of an actual application key will be described below. These are one of the examples, and any algorithm is applicable as long as the algorithm is capable of extending the length of an application key.

Figure 5:
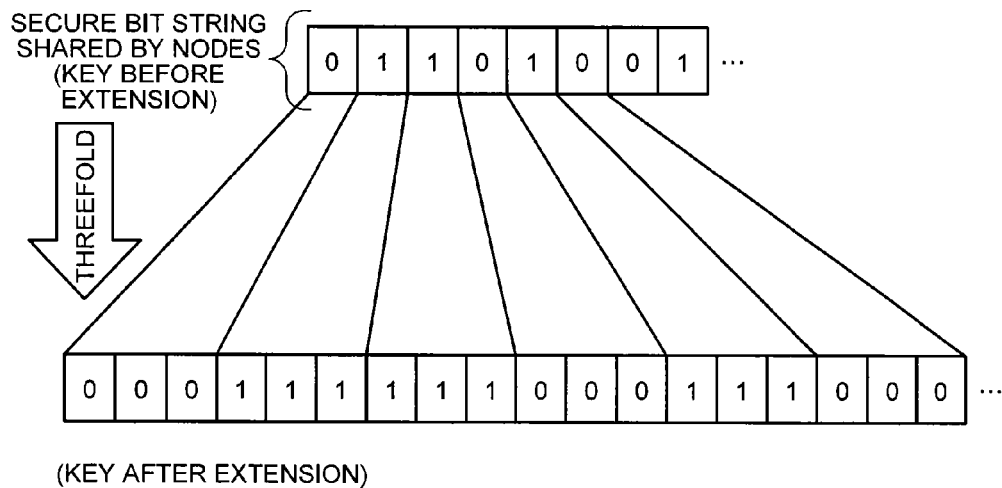
FIG. 5 is a diagram illustrating an example of an extension method of an application key.

FIG. 5 is a diagram illustrating an example of a simple extension method of an application key. The algorithm in FIG. 5 is an algorithm in which the application key is extended by replacing data included in the application key with data (conversion data), which has been determined and extended according to a pattern of the data. In the extension algorithm in FIG. 5, simply, when bit data of the application key before extension is "0", bit data of the extended application key is replaced by "000". Moreover, when the bit data of the application key before extension is "1", the bit data of the extended application key is replaced by "111". In this example, the extension magnification of the application key is three times.

As another example, when the bit data of the application key before extension is "0", the bit data of the extended application key may be replaced by "0011001100", and when the bit data of the application key before extension is "1", the bit data of the extended application key may be replaced by "1100110011". In this example, the extension magnification becomes 10 times. In this way, the extension of the application key can be easily executed whatever times the extension magnification is.

Figure 6:
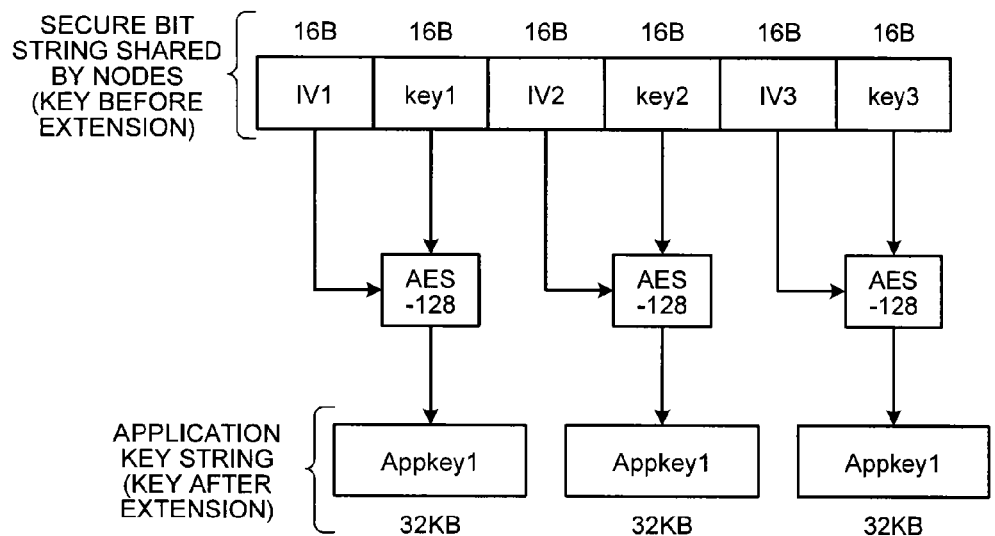
FIG. 6 is a diagram illustrating an example of an extension method of the application key.

FIG. 6 is a diagram illustrating an example of an extension method of an application key utilizing a cryptograph processing. The extension algorithm in FIG. 6 is an extension algorithm in which, using an application key as a parameter of the cryptograph processing, a cryptogram obtained by executing the cryptograph processing on a plaintext is generated as an extended key. FIG. 6 illustrates an example of an extension method using a cryptographic algorithm of "AES-128 bit CBC mode".

In this case, the extension unit 105 first cuts out every 16 bytes of the application key (before extension). The cut-out data is IV1, Key1, IV2, Key2, . . . in order from the top. For example, when the extension unit 105 encrypts certain 32K-byte data (target data) according to the AES-128 bit where IV1 and Key1 respectively serve as IV (Initial Vector) and key Key, 32K-byte data (Appkey1) is obtained. The extension unit 105 forms this data as a portion of the extended application key (extended key). By sequentially performing such processing in order of an IV1 and Key1 pair, an IV2 and Key2 pair, . . . and so on, data for 32 bytes (16-byte IV and 16-byte Key) can be sequentially extended to data for 32K bytes. In this case, the extension processing with the extension magnification of 1000 times is executed. The target data to be encrypted may be any data. For instance, all values of zero, or values which have been separately cut out beforehand from the application key (before extension) may be used as the target data. By adjusting a data length of the target data, a block length utilized in the AES, or the like, the extension magnification can be variously changed.

Next, error processing will be described. The node 100, which has received the communication starting request including the application key request from the application 200, can execute provision of the application key which satisfies the request from the application 200 according to the aforementioned processing. However, due to the restrictions of executable extension magnification and the like, there is a possibility that a throughput requested by the application cannot be responded. For example, simply, there is a case in which a requested large extension magnification cannot be supported. Further, when the extension magnification is excessively large, since security (safety) of the application key is reduced, there is also a possibility that the node 100 does not permit the large extension magnification.

In such conditions, several methods can be considered to deal with the behaviors of the node 100. For example, since provision of the application key at the requested throughput cannot be executed, the node 100 may be configured in such a manner that the node 100 gives an error reply to the communication request from the application and does not permit the connection. The node 100 may also be configured in such a manner that the node 100 starts to exchange the application key at the maximum possible extension magnification and replies to the application that the requested request throughput cannot be achieved and the request throughput which can be actually utilized.

Further, even when the negotiation of the extension method data is implemented between the nodes 100, the maximum values of the extension magnifications permitted by the node 100a and the node 100b may be different. Then, in such a case, it is possible that the node 100b cannot achieve the extension magnification notified from the node 100a and needs to perform extension of the application key at the extension magnification smaller than the notified extension magnification. In this case, the node 100b may give error notification that the node 100b cannot deal with the negotiation of the extension magnification and may cancel starting or changing of the extension by driving the negotiation into failure. Alternatively, another method may be considered in which the node 100b notifies the node 100a of the maximum possible extension magnification, so that the maximum possible application key extension between the node 100a and the node 100b can be achieved as well.

As described above, according to the present embodiment, even if the sharing speed of the application key shared between the nodes is restricted, the node can provide the application key to the application faster and more stably.

Figure 7:
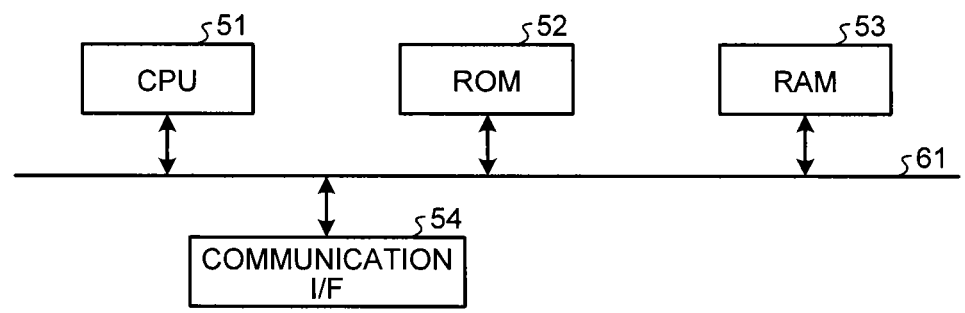
FIG. 7 is a hardware configuration diagram of an apparatus according to the present embodiment.

Next, a hardware configuration of an apparatus (nodes, applications) according to the present embodiment will be described using FIG. 7. FIG. 7 is an explanatory diagram illustrating the hardware configuration of the apparatus according to the present embodiment.

The apparatus according to the present embodiment includes a control device, such as a CPU (Central Processing Unit) 51, a storage device, such as a ROM (Read Only Memory) 52 and a RAM (Random Access Memory) 53, and a communication I/F 54 which communicates by connecting to a network, and a bus 61 which connects each device.

A program executed by the apparatus according to the present embodiment is provided by previously incorporating in the ROM 52 or the like.

The program executed by the apparatus according to the present embodiment may be configured in such a manner that the program is recorded in an installable or executable format file on a recording medium readable by a computer, such as a CD-ROM (Compact Disk Read Only Memory), a flexible disk (FD), CD-R (Compact Disk Recordable), DVD (Digital Versatile Disk), or the like and is provided as a computer program product.

Further, the program executed by the apparatus according to the present embodiment may be configured in such a manner that the program is provided by storing on a computer connected to a network, such as the Internet, and downloading via the network. Moreover, the program executed by the apparatus according to the present embodiment may be configured in such a manner that the program is provided or distributed via the network, such as the Internet.

The program executed by the apparatus according to the present embodiment can cause the computer to function as each device of the above-described apparatus. In this computer, the CPU 51 can read out and execute the program on a main storage external apparatus from a computer readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
a hardware processor that
shares a first cryptographic key with an external apparatus connected via a link, and further generates one or more second cryptographic keys and shares the one or more second cryptographic keys with the external apparatus through secret communication using the first cryptographic key;
generates an extended key by extending a length of one of the second cryptographic keys;
transmits the extended key to a first application which cryptographically communicates with a second application using the extended key as a cryptographic key, the external apparatus providing the extended key to the second application;
determines an extension method, which is executable in common with the external apparatus, from among a plurality of extension methods of the second cryptographic keys;
transmits, to the external apparatus, identification information identifying one of the second cryptographic keys that starts execution of the determined extension method; and
generates the extended key by extending the length of the one of the second cryptographic keys according to the determined extension method, by starting the execution of the determined extension method to the one of the second cryptographic keys identified by the identification information,
wherein the hardware processor transmits to the external apparatus extension method data including a priority order of the extension methods, receives from the external apparatus the extension method determined by the external apparatus based on the priority order from among the extension methods indicated by the extension method data, and determines the received extension method as the extension method which is executable in common with the external apparatus.

2. The apparatus according to claim 1, wherein the processor transmits to the external apparatus extension method data indicating at least one of executable extension methods, receives from the external apparatus the extension method determined by the external apparatus from among the extension methods indicated by the extension method data, and determines the received extension method as the extension method which is executable in common with the external apparatus.

3. The apparatus according to claim 1, wherein the processor further determines an extension method of the second cryptographic keys based on a throughput of the second cryptographic keys requested by the first application and based on a sharing speed of at least one of the first cryptographic key and the second cryptographic keys with the external apparatus.

4. The apparatus according to claim 3, wherein, when the requested throughput is changed, the processor determines the extension method based on the changed throughput and the sharing speed.

5. The apparatus according to claim 3, wherein, when at least one of the sharing speed and condition information indicating a condition of sharing processing of at least one of the first cryptographic key and the second cryptographic keys with the external apparatus is changed, the processor determines the extension method based on the throughput and the sharing speed.

6. The apparatus according to claim 1, wherein the processor generates the extended key by replacing data included in one of the second cryptographic keys with conversion data which is determined according to a pattern of the data and which is longer than the data.

7. The apparatus according to claim 1, wherein the processor generates, as the extended key, a cryptogram obtained by executing a cryptograph processing on a plaintext, the cryptograph processing being executed by using one of the second cryptographic keys as a parameter.

8. The apparatus according to claim 1, wherein the processor shares the second cryptographic keys with the external apparatus through the secret communication via one or more other communication apparatuses.

9. A communication system including a plurality of communication apparatuses, each of the communication apparatuses comprising:

a hardware processor that
shares a first cryptographic key with another communication apparatus connected via a link, and further generates one or more second cryptographic keys and shares the second cryptographic keys with the other communication apparatus through secret communication using the first cryptographic key;
generates an extended key by extending a length of one of the second cryptographic keys;
transmits the extended key to a first application which cryptographically communicates with a second application using the extended key as a cryptographic key, the other communication apparatus providing the extended key to the second application;
determines an extension method, which is executable in common with the other communication apparatus, from among a plurality of extension methods of the second cryptographic keys;
transmits to the other communication apparatus, identification information identifying one of the second cryptographic keys that starts execution of the extension method; and
generates the extended key by extending the length of the one of the second cryptographic keys according to the determined extension method, by starting the execution of the determined extension method to the one of the second cryptographic keys identified by the identification information,
wherein the hardware processor transmits to the other communication apparatus extension method data including a priority order of the extension methods, receives from the other communication apparatus the extension method determined by the other communication apparatus based on the priority order from among the extension methods indicated by the extension method data, and determines the received extension method as the extension method which is executable in common with the other communication apparatus.

10. A computer program product comprising a non-transitory computer-readable medium containing a computer program that causes a computer execute:
sharing a first cryptographic key with an external apparatus connected via a link, and further generating one or more a second cryptographic keys and sharing the second cryptographic keys with the external apparatus through secret communication using the first cryptographic key;
generating an extended key by extending a length of one of the second cryptographic keys;
transmitting the extended key to a first application which cryptographically communicates with a second application using the extended key as a cryptographic key the external apparatus providing the extended key to the second application;
determining an extension method, which is executable in common with the external apparatus, from among a plurality of extension methods of the second cryptographic keys;
transmitting to the external apparatus, identification information identifying one of the second cryptographic keys that starts execution of the extension method; and
generating the extended key by extending the length of the one of the second cryptographic keys according to the determined extension method, by starting the execution of the determined extension method to the one of the second cryptographic keys identified by the identification information,
wherein said transmitting to the external apparatus transmits extension method data including a priority order of the extension methods, receives from the external apparatus the extension method determined by the external apparatus based on the priority order from among the extension methods indicated by the extension method data, and determines the received extension method as the extension method which is executable in common with the external apparatus.

* * * * *